W. J. TYLER.
COMBINED PIPE UNION AND CHECK VALVE.
APPLICATION FILED JULY 10, 1917.
1,266,179.
Patented May 14, 1918.
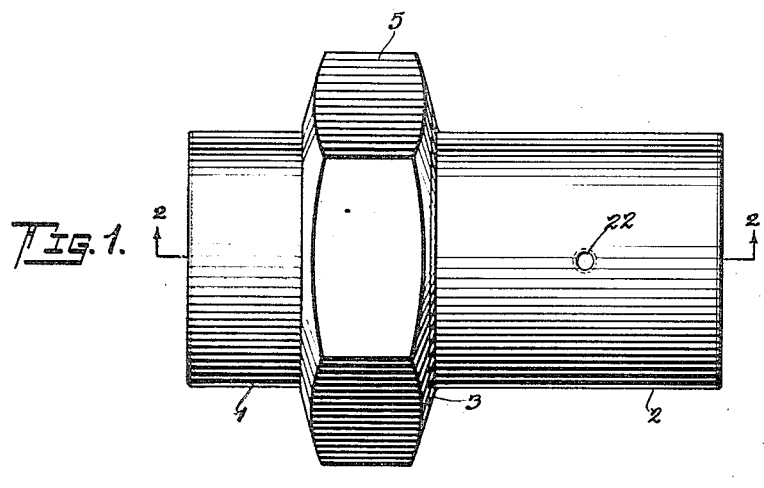
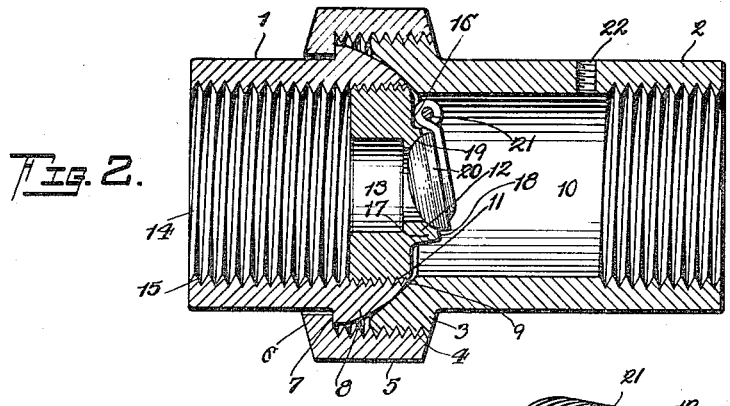
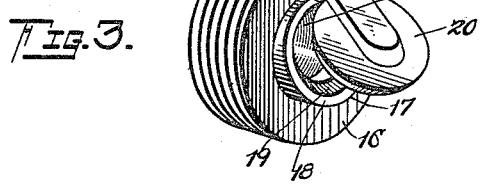
Witnesses
H. Harwood.
C. R. Ziegler.
Inventor
William J. Tyler.
By Joshua R. H. Potts.
His Attorney

UNITED STATES PATENT OFFICE.

WILLIAM J. TYLER, OF WESTMONT, NEW JERSEY.

COMBINED PIPE-UNION AND CHECK-VALVE.

1,266,179.   Specification of Letters Patent.   Patented May 14, 1918.

Application filed July 10, 1917.   Serial No. 179,610.

*To all whom it may concern:*

Be it known that I, WILLIAM J. TYLER, a citizen of the United States, residing at Westmont, in the county of Camden and State of New Jersey, have invented certain new and useful Improvements in Combined Pipe-Unions and Check-Valves, of which the following is a specification.

One object of my invention is to provide a device which will serve as a union for connecting sections of pipes and also as a check valve.

Another object is to so construct my invention that the check valve portion will be held in position by the pipe-engaging sections of the union.

A further object is to make my invention of a simple and durable construction and so that it can be easily and quickly assembled and taken apart.

These objects, and other advantageous ends which will be described hereinafter, I attain in the following manner, reference being had to the accompanying drawings in which—

Figure 1 is a side elevation of my invention.

Fig. 2 is a section taken on the line 2—2 of Fig. 1.

Fig. 3 is a perspective view of the check valve portion.

Referring to the drawings, 1 and 2 represent two pipe-engaging sections or coupling sleeves of the union. The section 2 has an annular flange 3 at one end, the periphery of said flange being provided with screw-threads 4. A nut 5 is adapted to be screwed on the threads 4 of the flange 3 and has an inwardly extending flange 6 which abuts a shoulder 7 of a head 8 on one end of the section 1.

The head 8 tapers from the shoulder 6, and this tapered end is designed to abut an outwardly flared recess 9 which communicates with a passage 10 provided by the section 2. The head 8 has internal screw-threads 11 in which is screwed a plug 12. This plug 12 has a passage 13 extending entirely therethrough and communicating with the passage 10 of the section 2 and the passage 14 of the section 1.

The plug 12 is of such diameter that when the parts are joined together as shown in Fig. 2, its inner face will engage the outwardly flared recess 9. The section 1 has its passage 14 internally screw-threaded as shown at 15 to permit the end of a pipe to be connected therewith, and the size of the screw-threads is different from that of the screw-threads 11 into which the plug 12 screws. Thus, the plug 12 is held against movement since it is confined on one side by the recess 9 and on the other side by the intersection of the screw-threads 11 with the screw-threads 15.

The inner face 16 of the plug 12 has a boss 17, the outer face 18 of said boss extending at an incline. A valve seat 19 is formed on said boss and communicates with the passage 13. A valve 20 is designed to swing on a bracket 21 which projects from the outer surface of the plug 12. This valve 20 acts as a check to prevent fluid from passing through the passage 10 into the passage 14 of the section 1. However, it is possible for fluid to pass in an opposite direction, namely, through the passage 14 and plug 12 into the passage 10, since the valve will be raised from its seat to permit said fluid to pass.

My invention can be used with advantage any place where a check valve is required, such for example as in pumping systems where water or other fluid is pumped to a tank on a roof. In this instance, the check valve 20 would prevent the water from returning after it had been once pumped through the section 1 and plug 12 into the passage 10, it being noted of course that the section 2 can be connected by a pipe section to lead to a tank or other receptacle into which it is desired to pump the fluid.

By having the surface 18 and valve seat arranged at an incline as above described, the valve will be held out of a vertical position when the sections 1 and 2 are arranged horizontally as illustrated in Fig. 2; thus the complete closure of the valve is always assured.

If desired, my invention can be placed in an upright position instead of in a horizontal position as illustrated. When placed in an upright position, the section 2 is uppermost so that the valve 20 will fall into engagement with the valve seat. I preferably make the section 2 of greater length than the section 1, and provide it with a tapped hole 22 which communicates with the passage 10. Thus a relief valve (not illustrated) can be readily attached to the section 2 if desired.

The nut 5 normally holds the sections 1 and 2 tightly together, and when in this position, the plug 12 is firmly held in position since it cannot rotate to any appreciable extent.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A combined pipe union and check valve including two coupling sleeves arranged end to end, means for binding said ends together, a plug secured in one of said sleeves to hold it in place so as to be mounted independently of the other sleeve, said plug having a passage and a valve seat therein, a valve movably supported on said plug and adapted to engage said valve seat, means provided by said first sleeve to limit the distance in which the plug can be inserted therein, the other of said sleeves having a portion for abutment by said plug to prevent its movement out of said first sleeve after the sleeves are joined together, substantially as described.

2. A combined pipe union and check valve including two coupling sleeves arranged end to end and secured together, a plug screwed into one of said sleeves to hold it in place and having a passage and a valve seat therein, a valve movably supported on said plug and designed to engage said valve seat, means provided by said first sleeve to limit the distance to which the plug can be screwed therein, the other of said sleeves having a portion for abutment by said plug to prevent movement out of said first section when the sleeves are joined together, substantially as described.

In testimony whereof I have signed my name to this specification in the presence of two subscribing witnesses.

WILLIAM J. TYLER.

Witnesses:
ALEX. WALTER,
HANS WENIGER.